(12) United States Patent
Choi et al.

(10) Patent No.: US 12,314,053 B2
(45) Date of Patent: May 27, 2025

(54) APPARATUS FOR ESTIMATING POSITION OF TARGET, ROBOT SYSTEM HAVING THE SAME, AND METHOD THEREOF

(71) Applicants: Hyundai Motor Company, Seoul (KR); Kia Corporation, Seoul (KR)

(72) Inventors: Jun Yeong Choi, Seoul (KR); Ho Jun Ji, Gyeonggi-do (KR); Hwan Hee Lee, Gyeonggi-do (KR); Tae Young Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 301 days.

(21) Appl. No.: 17/527,636

(22) Filed: Nov. 16, 2021

(65) Prior Publication Data
US 2022/0269273 A1    Aug. 25, 2022

(30) Foreign Application Priority Data
Feb. 23, 2021 (KR) .......................... 10-2021-0024400

(51) Int. Cl.
| | | |
|---|---|---|
| G05D 1/02 | (2020.01) |
| G01S 17/08 | (2006.01) |
| G01S 17/89 | (2020.01) |
| G01S 17/931 | (2020.01) |
| G05D 1/00 | (2006.01) |

(52) U.S. Cl.
CPC .............. *G05D 1/024* (2013.01); *G01S 17/08* (2013.01); *G01S 17/89* (2013.01); *G01S 17/931* (2020.01); *G05D 1/0272* (2013.01); *G05D 1/0274* (2013.01)

(58) Field of Classification Search
None
See application file for complete search history.

(56) References Cited

U.S. PATENT DOCUMENTS

| | | | |
|---|---|---|---|
| 8,024,072 B2 | 9/2011 | Park et al. | |
| 8,594,860 B2 | 11/2013 | Lee et al. | |
| 8,781,732 B2 | 7/2014 | Lee et al. | |
| 2004/0167669 A1* | 8/2004 | Karlsson | G05D 1/0278 |
| | | | 700/259 |
| 2008/0065267 A1* | 3/2008 | Hong | G05D 1/0274 |
| | | | 901/1 |

(Continued)

FOREIGN PATENT DOCUMENTS

| | | | |
|---|---|---|---|
| CN | 105911518 A | * 8/2016 | |
| CN | 109579849 A | * 4/2019 | ........... G01C 21/206 |

(Continued)

OTHER PUBLICATIONS

Machine translation of CN-105911518-A (Year: 2016).*
Machine translation of CN-109579849-A (Year: 2019).*

*Primary Examiner* — Anne Marie Antonucci
(74) *Attorney, Agent, or Firm* — Fox Rothschild LLP

(57) ABSTRACT

An apparatus for estimating a position of a target may include a particle generator to generate a plurality of particles on a map, a particle selector to calculate position accuracy of each of the plurality of particles, based on data sensed related to a position of a target, and select, as a reference particle, at least one of the plurality of particles, based on the position accuracy, and a position determining device to determine the position of the target, based on the reference particle.

16 Claims, 8 Drawing Sheets

(56) References Cited

U.S. PATENT DOCUMENTS

| | | | |
|---|---|---|---|
| 2008/0119961 A1* | 5/2008 | Myeong | G05D 1/0272 |
| | | | 700/262 |
| 2009/0210092 A1 | 8/2009 | Park et al. | |
| 2010/0174409 A1* | 7/2010 | Park | G05D 1/0253 |
| | | | 700/259 |
| 2011/0082585 A1* | 4/2011 | Sofman | G05D 1/0274 |
| | | | 700/258 |
| 2012/0109420 A1 | 5/2012 | Lee et al. | |
| 2012/0290254 A1* | 11/2012 | Thrun | G01S 19/49 |
| | | | 702/150 |
| 2013/0304374 A1 | 11/2013 | Lee et al. | |
| 2014/0129027 A1* | 5/2014 | Schnittman | G05D 1/0242 |
| | | | 700/253 |
| 2014/0350839 A1* | 11/2014 | Pack | G05D 1/0231 |
| | | | 901/1 |

FOREIGN PATENT DOCUMENTS

| | | |
|---|---|---|
| JP | 2009-190164 A | 8/2009 |
| JP | 2013148356 A | 8/2013 |
| KR | 20130072614 A | 7/2013 |
| KR | 20140045848 A | 4/2014 |
| KR | 101722339 B1 | 4/2017 |
| KR | 101731968 B1 | 5/2017 |
| KR | 102194426 B1 | 12/2020 |
| WO | 2013/002067 A1 | 1/2013 |

\* cited by examiner

APPARATUS FOR ESTIMATING POSITION OF TARGET, ROBOT SYSTEM HAVING THE SAME, AND METHOD THEREOF

CROSS-REFERENCE TO RELATED APPLICATION

This application claims under 35 U.S.C. § 119(a) the benefit of Korean Patent Application No. 10-2021-0024400, filed in the Korean Intellectual Property Office on Feb. 23, 2021, the entire contents of which are incorporated herein by reference.

BACKGROUND

(a) Technical Field

The present disclosure relates to an apparatus for estimating a position of a target, a robot system including the same, and a method thereof.

(b) Description of the Related Art

Recently, as technology related to a robot has been developed, various types of robots have been used in households or industrial fields. The robots range from household robots that perform housework, such as cleaning while moving around the house, to industrial robots that perform mechanical work in industrial sites for manufacturing.

In particular, the robots may perform work in place of a human being while moving in or through several zones. It is important to recognize the current position of movable robots. As such, various arrangements have been utilized to estimate the position of a movable robot by using a separate wireless device or comparing position information between several time points. However, since these arrangements require a separate communication device and a complex computational algorithm, a high-cost robot system is required.

SUMMARY

An aspect of the present disclosure provides an apparatus for estimating a position of a target, capable of performing a global positioning operation of a robot by using only a sensor provided in the robot, instead of a separate device or a complex algorithm, thereby reducing the manufacturing cost of the robot and efficiently performing the procedure of estimating a position, a robot system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for estimating a position of a target may include a particle generator to generate a plurality of particles on a map, a particle selector to calculate position accuracy of each of the plurality of particles, based on data sensed related to the position of the target, and select, as a reference particle, at least one of the plurality of particles, based on the position accuracy, and a position determining device to determine the position of the target, based on the reference particle.

According to an embodiment, the particle selector may select a particle having position accuracy, which is equal to or greater than a reference value, as the reference particle.

According to an embodiment, the particle selector may calculate the position accuracy of each of the plurality of particles, by comparing the map with the sensed data.

According to an embodiment, the particle selector may calculate the position accuracy of each of the plurality of particles, by performing convolution for a cost map obtained through distance-transformation for the map and the sensed data.

According to an embodiment, the particle selector may re-distribute remaining particles other than the reference particle, around the reference particle.

According to an embodiment, the particle selector may re-distribute remaining particles other than the reference particle, based on the position accuracy of the reference particle.

According to an embodiment, the particle selector may re-calculate position accuracy of each of a plurality of reference particles after moving the target to a specific distance or more, when the plurality of reference particles are provided, and re-select the reference particle, based on the re-calculated position accuracies of the reference particles.

According to an embodiment, the particle selector may iteratively select the reference particle until the reference particles are convergent to one reference particle.

According to an embodiment, the position determining device may determine, as the position of the target, a position of the one reference particle to which the reference particles are convergent.

According to an embodiment, the position determining device may determine a position of a reference particle, which has the highest position accuracy, of a plurality of reference particles as the position of the target, when the plurality of reference particles are provided.

According to another aspect of the present disclosure, a robot system may include a sensor to sense a distance between a robot and a surrounding object and a position estimating device to calculate position accuracy of each of a plurality of particles generated on a map, based on sensed data by the sensor, select, as a reference particle, at least one of the plurality of particles, based on the position accuracy, and estimate a position of a target, based on the reference particle.

According to an embodiment, the sensor may include a LIDAR to detect a distance between the robot and the surrounding object.

According to an embodiment, the robot system may further include a driver to move a robot and calculate a moving distance of the target, based on a value measured through a wheel encoder.

According to another aspect of the present disclosure, a method for estimating a position of a target may include generating, by a particle generator, a plurality of particles on a map; calculating, by a particle selector, position accuracy of each of the plurality of particles, based on data sensed related to the position of the target; selecting, by the particular selector, at least one of the plurality of particles as a reference particle, based on the position accuracy; and determining, by a position determining device, the position of the target, based on the reference particle.

According to an embodiment, the selecting of the at least one of the plurality of particles as the reference particle may include selecting the particle having position accuracy, which is equal to or greater than a reference value, as the reference particle.

According to an embodiment, the selecting of the at least one of the plurality of particles as the reference particle may include calculating the position accuracy of each of the plurality of particles, by comparing the map with the sensed data.

According to an embodiment, the selecting of the at least one of the plurality of particles as the reference particle may include calculating the position accuracy of each of the plurality of particles, by performing convolution for a cost map obtained through distance-transformation for the map and the sensed data.

According to an embodiment, the selecting of the at least one of the plurality of particles as the reference particle may include re-calculating position accuracy of each of a plurality of reference particles after moving the target to a specific distance or more, when the plurality of reference particles are provided, and re-selecting the reference particle, based on the re-calculated position accuracies of the reference particles.

According to an embodiment, the selecting of the at least one of the plurality of particles as the reference particle may include iteratively selecting the reference particle until the reference particles are convergent to one reference particle.

According to an embodiment, the determining of the position of the target may include datelining, as the position of the target, a position of the one reference particle to which the reference particles are convergent.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
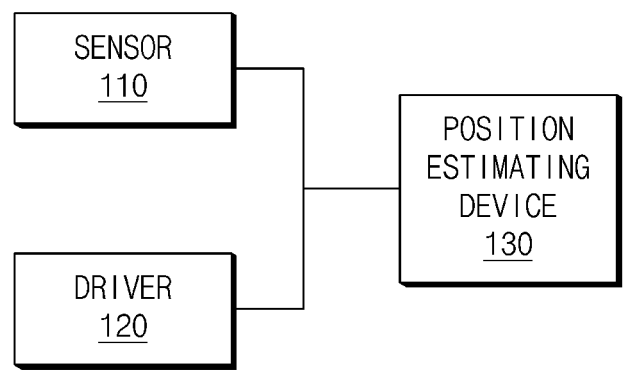
FIG. 1 is a block diagram illustrating the configuration of a robot system, according to an embodiment of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

FIG. 1 is a block diagram illustrating the configuration of a robot system, according to an embodiment of the present disclosure.

Referring to FIG. 1, according to an embodiment of the present disclosure, a robot system 100 may include a sensor 110, a driver 120, and a position estimating device 130.

The sensor 110 may sense terrain information around a robot. For example, the sensor 110 may sense a distance between the robot and a surrounding object. In detail, the sensor 110 may transmit a signal (for example, an optical signal) to the surrounding object (for example, a wall or an obstacle) and may detect a signal reflected from the surrounding object, thereby measuring the distance. In addition, the information on the distance measured by the sensor 110 may be transmitted to the position estimating device 130. For example, the sensor 110 may include a LIDAR sensor.

The driver 120 may move a robot. For example, the driver 120 may move the robot to a destination through a wheel. In this case, the driver 120 may calculate the moving distance of the robot, based on a value measured through a wheel encoder. In addition, information on the moving distance calculated by the driver 120 may be transmitted to the position estimating device 130.

The position estimating device 130 may generate a plurality of particles throughout an entire portion of a map, and may calculate the accuracy (position accuracy) of the position of each of a plurality of particles, based on data sensed by the sensor 110. In this case, the particle may be placed at a candidate position of a target (for example, a robot). In this case, the position estimating device 130 may calculate the position accuracy of each particle, by matching the data (for example, distance information) sensed by the sensor 110 with each particle.

In addition, the position estimating device 130 may select at least one of the plurality of particles as a reference particle, based on the position accuracy calculated with respect to each particle. In this case, the reference particle may be selected to a particle having the position accuracy, which is equal to or higher than a preset reference value. In addition, remaining particles other than the reference particle may be re-distributed around the reference particle.

In addition, the position estimating device 130 may estimate the position of the target, based on the selected reference particle. For example, the position estimating device 130 may determine a reference particle, which has the highest position accuracy, of the reference particle, or may determine the position of the target by iteratively selecting the reference particle, until the reference particle is convergent to one reference particle after the target is moved by the driver 120. The details thereof will be described later in detail with reference to FIGS. 2 to 6.

Figure 2:
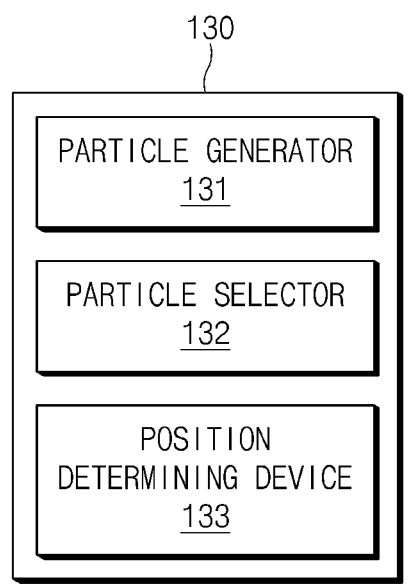
FIG. 2 is a block diagram illustrating the configuration of an apparatus for estimating a position of a target, according to an embodiment of the present disclosure.

FIG. 2 is a block diagram illustrating the configuration of an apparatus (position estimating apparatus) for estimating a position of a target, according to an embodiment of the present disclosure.

Referring to FIG. 2, according to an embodiment of the present disclosure, the position estimating apparatus 130 may include a particle generator 131, a particle selector 132, and a position determining device 133. In this case, the position estimating apparatus 130 of FIG. 2 may have the substantially components as those of the position estimating apparatus 130 of FIG. 1.

The particle generator 131 may generate a plurality of particles on a map. In this case, each particle may be placed at a candidate position of a target to be estimated in position on the map. Alternatively, the particles may be uniformly arranged at regular distances on the map.

The particle selector 132 may calculate the position accuracy of each particle, based on data sensed related to the position of the target. In this case, the particle selector 132 may calculate the position accuracy of each particle, by comparing the map with the sensed data. For example, the particle selector 132 may calculate the position accuracy of each particle, by comparing a position of each particle on the map with sense information obtained from an external sensor (for example, the sensor 110 of FIG. 1).

In detail, the particle selector 132 may calculate the position accuracy of each particle by performing convolution for a cost map, which is obtained by distance-transforming the map stored in advance, and the sensed data. In this case, the cost map is a result obtained through distance-transformation for a map of a zone in which the target is positioned. The cost map may be configured such that the value in the cost map becomes gradually decreased, as the target approaches a point having a wall or an obstacle on the map, and gradually increased, as the target approaches a point having no wall or obstacle.

In addition, the particle selector 132 may select at least one of the plurality of particles as a reference particle, based on the calculated position accuracy. In this case, the reference particle may be selected as a particle that is likely to correspond to a current position of the target (for example, the robot) with higher probability. For example, the particle selector 132 may select a particle having the position accuracy, which is equal to or greater than the reference value, as the reference particle.

The particle selector 132 may re-distribute remaining particles other than the reference particle, around the reference particle. For example, the particle selector 132 may re-distribute the remaining particles other than the reference particle, based on the position accuracy of the reference particle. In this case, when the plurality of reference particles are provided, the particle selector 132 may differently distribute remaining particles depending on the position accuracies of each reference particle. For example, when the position accuracies of three reference particles are 90%, 80%, and 60%, the remaining particles may be distributed around three reference particles at the ratio of 9:8:6.

In addition, the particle selector 132 may re-calculate position accuracy of each reference particle after moving the target to a specific distance or more, when the plurality of reference particles are provided. In this case, the particle selector 132 may re-select a reference particle, based on the re-calculated position accuracy of the reference particle. As described above, the particle selector 132 may iteratively the reference particle until the reference particles are convergent to one reference particle.

The position determining device 133 may determine the position of the target, based on the reference particle. For example, the position determining device 133 may determine the position of one reference particle, to which reference particles are convergent through the particle selector 132, as the position of the target. Alternatively, the position determining device 133 may determine the position of the reference particle having the highest position accuracy as the position of the target, when the plurality of reference particles are provided.

According to an embodiment of the present disclosure, in the apparatus (position estimating apparatus) 130 for estimating the position, and the robot system 100 including the same, the global positioning operation of the robot may be performed by using only the sensor provided in the robot instead of the separate device or the complex algorithm, thereby reducing the manufacturing cost of the robot and efficiently performing the procedure of estimating the position.

Figure 3:
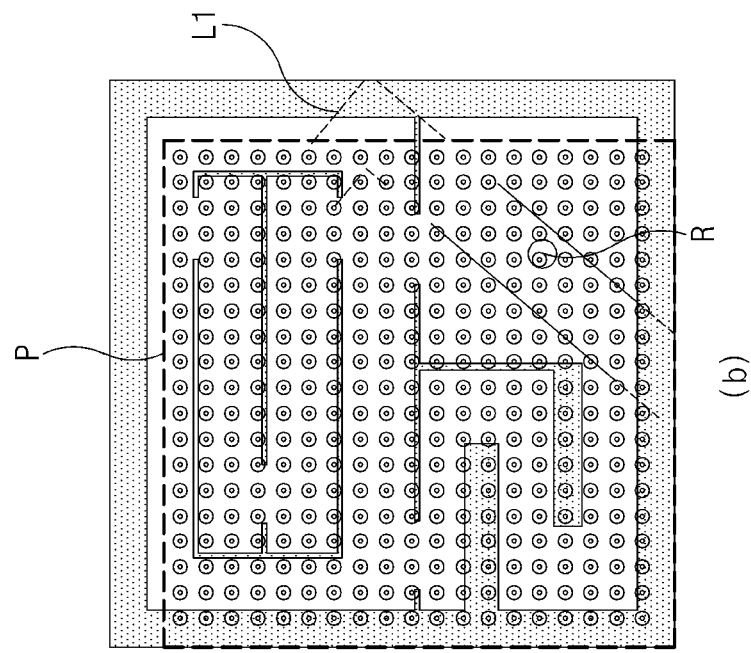
FIG. 3 is a view illustrating an operation of generating a particle in an apparatus for estimating a position of a target, according to an embodiment of the present disclosure.
Figure 3:
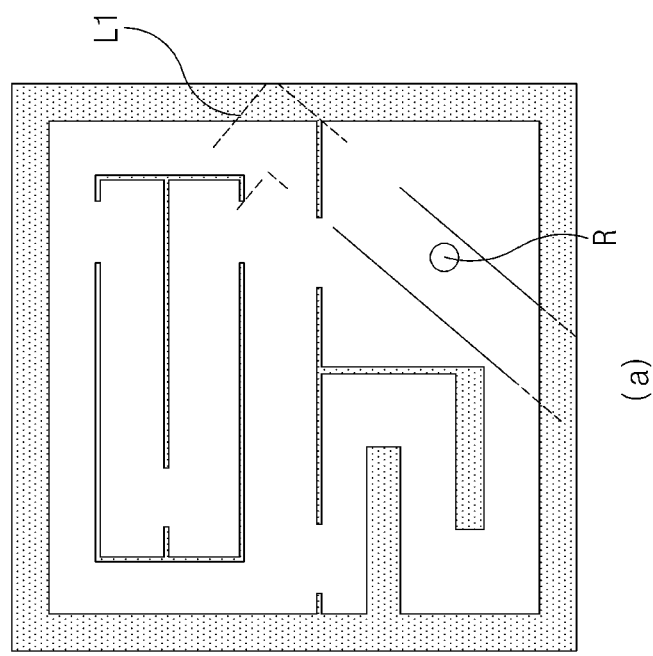

FIG. 3 is a view illustrating an operation of generating a particle in a position estimating apparatus, according to an embodiment of the present disclosure.

Referring to subfigure (a) of FIG. 3, reference numeral "R" represents a target (for example, a robot) to be position-estimated by the position estimating apparatus 130, and reference numeral "L1" represents sensed data measured through the sensor (for example, a LIDAR sensor) 110. In this case, reference numeral "L1" represents a portion of the structure (wall) extracted from the sensed data measured by a LIDAR sensor. Alternatively, as illustrated in subfigure (a) of FIG. 3, the position estimating apparatus 130 may set an arbitrary position on the map as a position of the target "R".

Alternatively, referring to subfigure (b) of FIG. 3, the position estimating apparatus 130 may generate a plurality of particles "P" at arbitrary positions on the map. In this case, the position estimating apparatus 130 may uniformly generate the particles throughout the whole area of the map, as illustrated in subfigure (b) of FIG. 3, or may generate the particles in only candidate positions in which the target "R" is likely to be positioned with a higher probability on the map. For example, coordinates are assigned to each particle "P".

Figure 4:
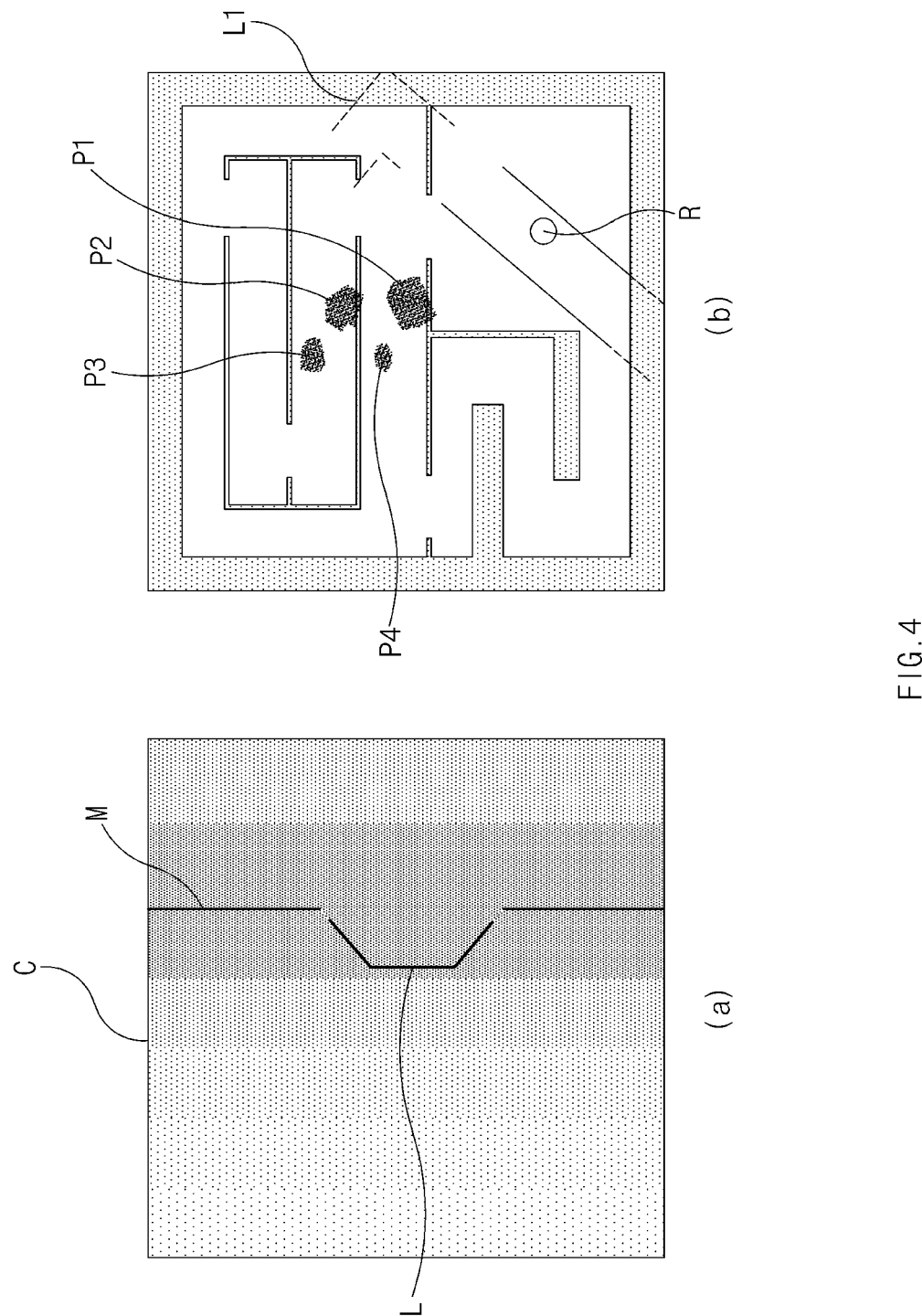
FIG. 4 is a view illustrating an operation of selecting a reference particle in an apparatus for estimating a position of a target, according to an embodiment of the present disclosure.

FIG. 4 is a view illustrating an operation of generating a particle in a position estimating apparatus, according to an embodiment of the present disclosure.

Referring to subfigure (a) of FIG. 4, according to an embodiment of the present disclosure, reference numeral "C" represents a cost map obtained by distance-transforming the map by the position estimating apparatus 130, reference sign "M" represents data (for example, a wall), or reference sign "L" represents data measured through a LIDAR sensor. Alternatively, as illustrated by shade in subfigure (a) of FIG. 4, a portion, which is closer to a wall or an obstacle, of the cost map "C" is displayed to be darker because the portion has a lower value, and a portion, which is farther away from a wall or an obstacle, of the cost map "C" is displayed to be brighter because the portion has a higher value. Accordingly, the position estimating apparatus 130 may determine whether a wall or an obstacle is present around a specific position, based on the cost map "C".

As described above, according to an embodiment of the present disclosure, the position estimating apparatus 130 may perform convolution for the data of the cost map "C" generated through distance-transformation and the sensed data received from the LIDAR sensor. Accordingly, the position accuracy may be calculated with respect to the plurality of particles generated in subfigure (a) of FIG. 3.

As illustrated in subfigure (b) of FIG. 4, four particles of the plurality of particles are calculated as reference particles "P1" to "P4" by the position estimating apparatus 130. In this case, the reference particles "P1" to "P4" may be selected as particles having position accuracies equal to or higher than a reference value (for example, 80%).

Alternatively, as illustrated subfigure (b) of FIG. 4, remaining particles may be re-distributed around the reference particles "P1" to "P4". In this case, the remaining particles may be differently distributed depending on the position accuracy of each of the reference particles "P1" to "P4". For example, it may be understood from subfigure (b) FIG. 4 that the remaining particles are distributed in order from the reference particle "P4" to "P1", because the position accuracy is heightened toward the reference particle "P1" from the reference particle "P4".

Figure 5:
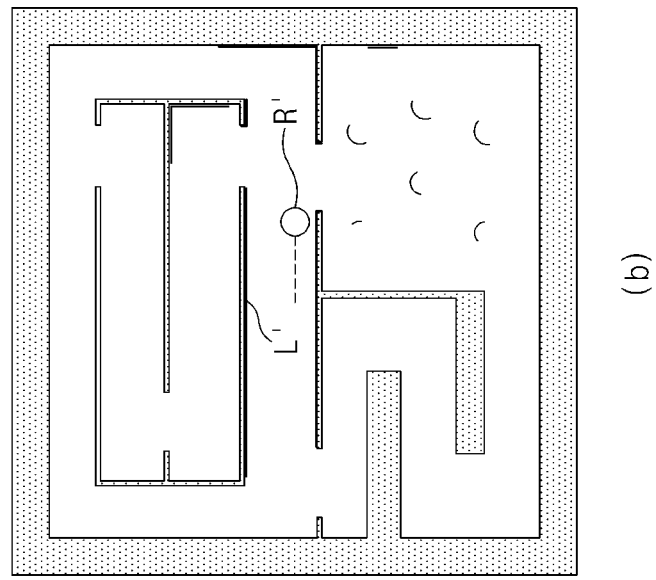
FIG. 5 is a view illustrating an operation of generating a position in an apparatus for estimating a position of a target, according to an embodiment of the present disclosure.
Figure 5:
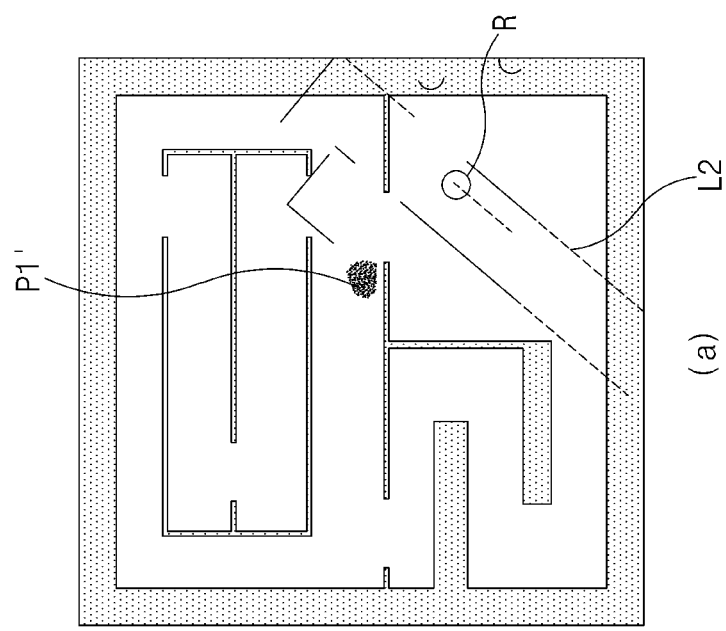

FIG. 5 is a view illustrating an operation of estimating a position of a target in a position estimating apparatus, according to an embodiment of the present disclosure.

Referring to subfigure (a) of FIG. 5, reference numeral "R" represents that the target illustrated in FIGS. 3 and 4 is moved right by a specific distance, and reference numeral "L2" represents data measured through a LIDAR sensor. Reference numeral "P1'" represents the reference particle "P1" when the plurality of reference particles "P1" to "P4" illustrated in subfigure (b) of FIG. 4 are convergent to one reference particle "P1" by the position estimating apparatus 130 according to an embodiment of the present disclosure. In this case, as illustrated in subfigure (a) of FIG. 5, a reference particle is re-selected after the target "R" is moved right by the specific distance through the above-described manner. In this case, the above-described procedure may be iteratively performed until the reference particles are convergent to one reference particle. For example, the converging procedure of the reference particles may be performed through a particle swarm optimization (PSO) algorithm.

Subfigure (b) of FIG. 5 illustrates that the position estimating apparatus 130 determines the position of the reference particle "P1'" illustrated in subfigure (a) of FIG. 5 as a current position of a target R'. In addition, it may be understood from subfigure (b) of FIG. 5 that even sensed data "L" by the LIDAR sensor corresponds to the current position of the real target R'.

As described above, conventionally, a typical robot estimates a current position based on a position at a previous time "t−1". Accordingly, when the current position is lost from the robot system due to re-booting or errors, the position may not be continuously estimated. However, according to an embodiment of the present disclosure, the robot system 100 including the position estimating apparatus 130 may effectively estimate the current position even if the robot loses the current position, such that the operation of a robot system is continuously performed.

Figure 6:
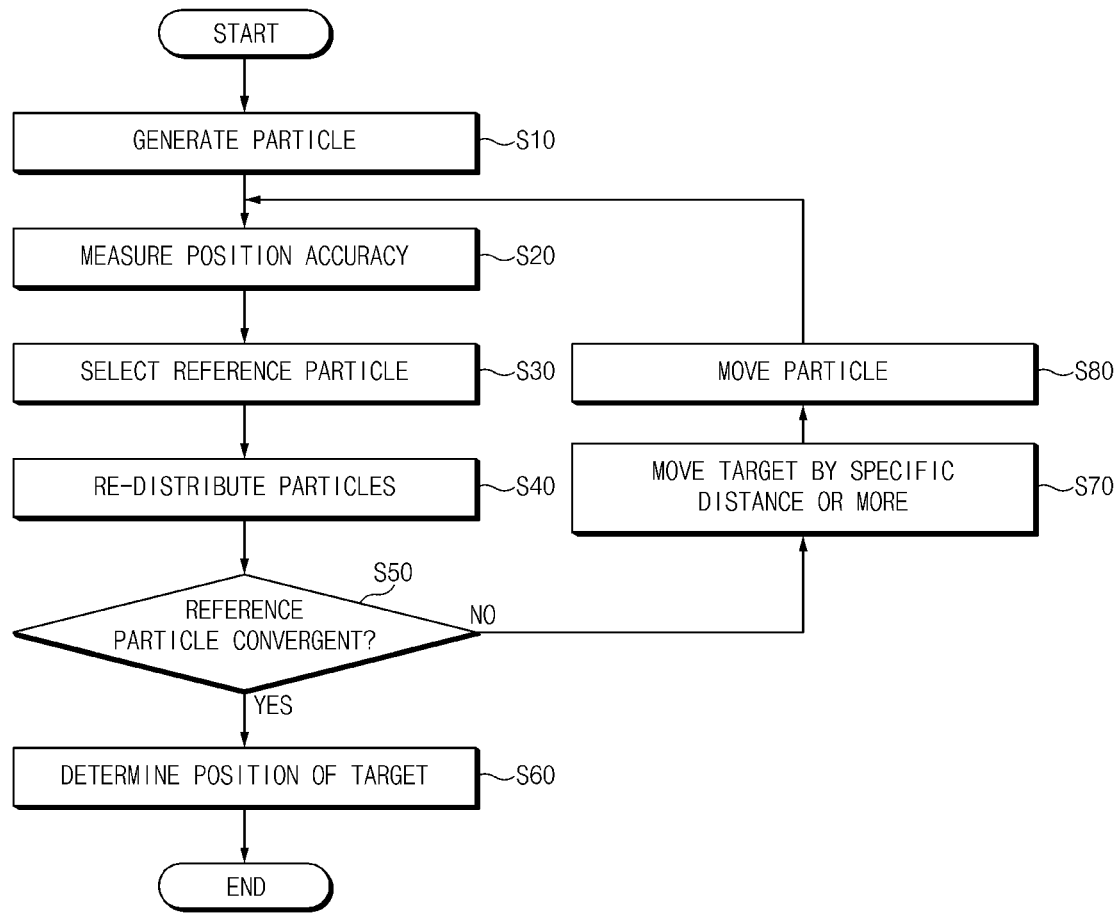
FIG. 6 is a block diagram illustrating the configuration of an apparatus for estimating a position of a target, according to an embodiment of the present disclosure.

FIG. 6 is a flowchart illustrating a method for estimating a position of a target, according to an embodiment of the present disclosure.

Referring to FIG. 6, according to an embodiment of the present disclosure, the position estimating apparatus 130 may generate a particle on a map (S10). In this case, the specific number of particles may be uniformly generated throughout the whole area of the map or may be generated around a candidate position. In addition, the position estimating apparatus 130 may measure position accuracy may with respect to each of the generated particles (S20). In this case, the position estimating apparatus 130 may measure the position accuracy by measuring the matching between sensed data by the sensor 110 (for example, a LIDAR sensor) with a position of each particle on the map.

In addition, the position estimating apparatus 130 may select a reference particle of the generated particles, based on the position accuracy (S30). For example, the position estimating apparatus 130 may select a particle, which has position accuracy equal to or higher than a reference value, as the reference particle or may select "n" number of particles, which have higher position accuracy when the particles are arranged in order of higher position accuracy, as reference particles.

In addition, remaining particles of the particles may be re-distributed around the reference particle (S40). For example, when a plurality of reference particles are provided, the remaining particles may be re-distributed differently depending on the position accuracies of the reference particles.

Next, the position estimating apparatus 130 determines the convergence of the reference particle (S50). When the reference particle is convergent to one reference particle, the position of the reference particle may be determined as being the position of the target (S60). Meanwhile, when the reference particles is not convergent, but a plurality of reference particles are calculated ("NO"), the target may be moved by a specific distance or more (S70). In addition, as the target is moved, the generated particles may be moved together (S80). In addition, S20 to S50, which are described above, may be iteratively performed until the reference particles re convergent to one reference particle.

Figure 7:
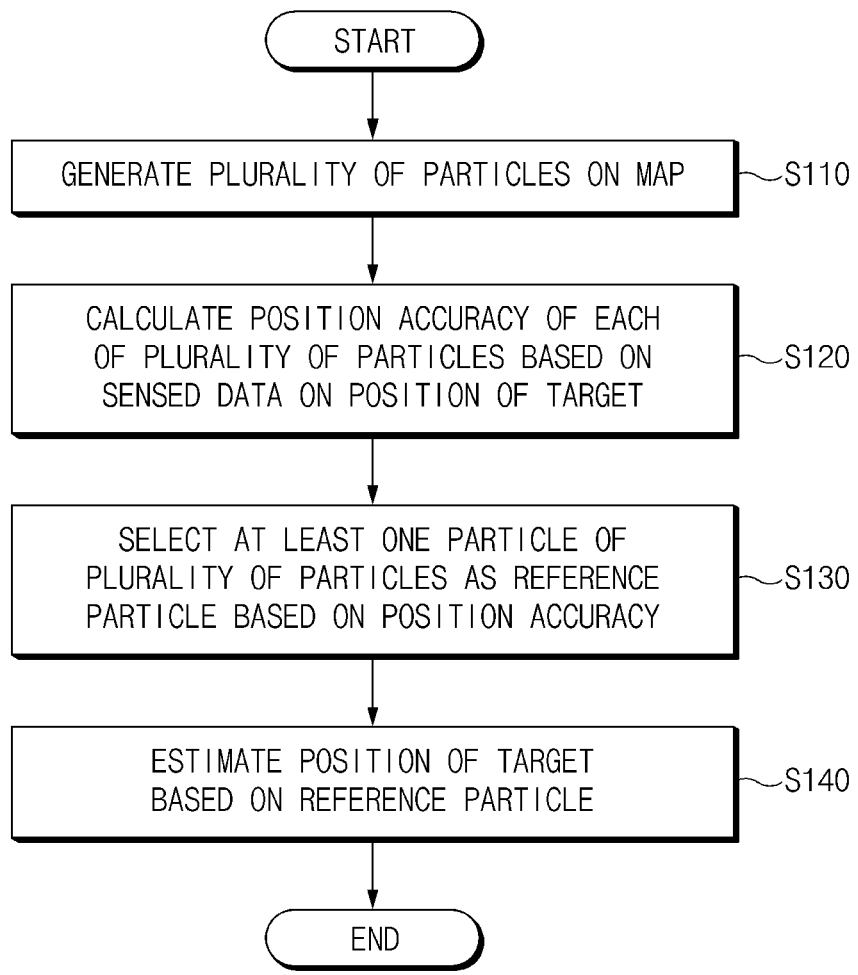
FIG. 7 is a flowchart illustrating a method for estimating a position of a target, according to an embodiment of the present disclosure.

FIG. 7 is a flowchart illustrating a method for estimating a position of a target, according to an embodiment of the present disclosure.

Hereinafter, according to an embodiment of the present disclosure, a method for estimating a position of a target will be described in detail with reference to FIG. 7. Hereinafter, it is assumed that the position estimating apparatus 130 of FIG. 2 performs the process of FIG. 7. In addition, in the description made with reference to FIG. 7, it may be understood that operations described as being performed by the apparatus are controlled by a processor of the position estimating apparatus 130.

Referring to FIG. 7, according to an embodiment of the present disclosure, in the method for estimating the position, a plurality of particles may be generated on a map (S110). In this case, each particle may be placed at a candidate position of a target to be estimated in position on a map. Alternatively, the particles may be uniformly placed at regular distances on the map.

In addition, the processor may calculate the position accuracy of each particle, based on the sensed data related to the position of the target (S120). In this case, the processor may calculate the position accuracy of each particle, by comparing the map with the sensed data. For example, the processor may calculate the position accuracy of each particle, by comparing a position of each particle on the map with the sense information obtained from an external sensor (for example, the sensor 110 of FIG. 1) in S120. In detail, in S120 the processor may calculate the position accuracy of each particle by performing convolution for a cost map obtained by distance-transforming a map stored in advance and the sensed data.

Next, at least one particle of the plurality of particles may be selected as a reference particle, based on the calculated position accuracy (S130). In this case, the reference particle may be selected as a particle that is likely to correspond to a current position of the target (for example, the robot) with higher probability. For example, the processor may select a particle having the position accuracy, which is equal to or greater than the reference value, as the reference particle in S130.

In addition, the processor may re-distribute remaining particles other than the reference particle, around the reference particle in S130. For example, the processor may re-distribute remaining particles other than the reference particle, based on the position accuracy of the reference particle. For example, when a plurality of reference particles are provided, the remaining particles may be re-distributed differently depending on the position accuracies of the reference particles.

In addition, the processor may re-calculate the position accuracy of each reference particle after moving the target to a specific distance or more, when a plurality of reference particles are provided, in S120 and S130. In this case, the processor may re-select a reference particle, based on the re-calculated position accuracy of the reference particle. As described above, the processor may iteratively select the reference particle until the reference particles is convergent to one reference particle.

In addition, the processor may determine the position of the target, based on the reference particle (S140). For example, the processor may determine the position of one reference particle, to which reference particles are convergent, as the position of the target. Alternatively, the processor may determine the position of a reference particle having the highest position accuracy as the position of the target, when a plurality of reference particles are provided.

Figure 8:
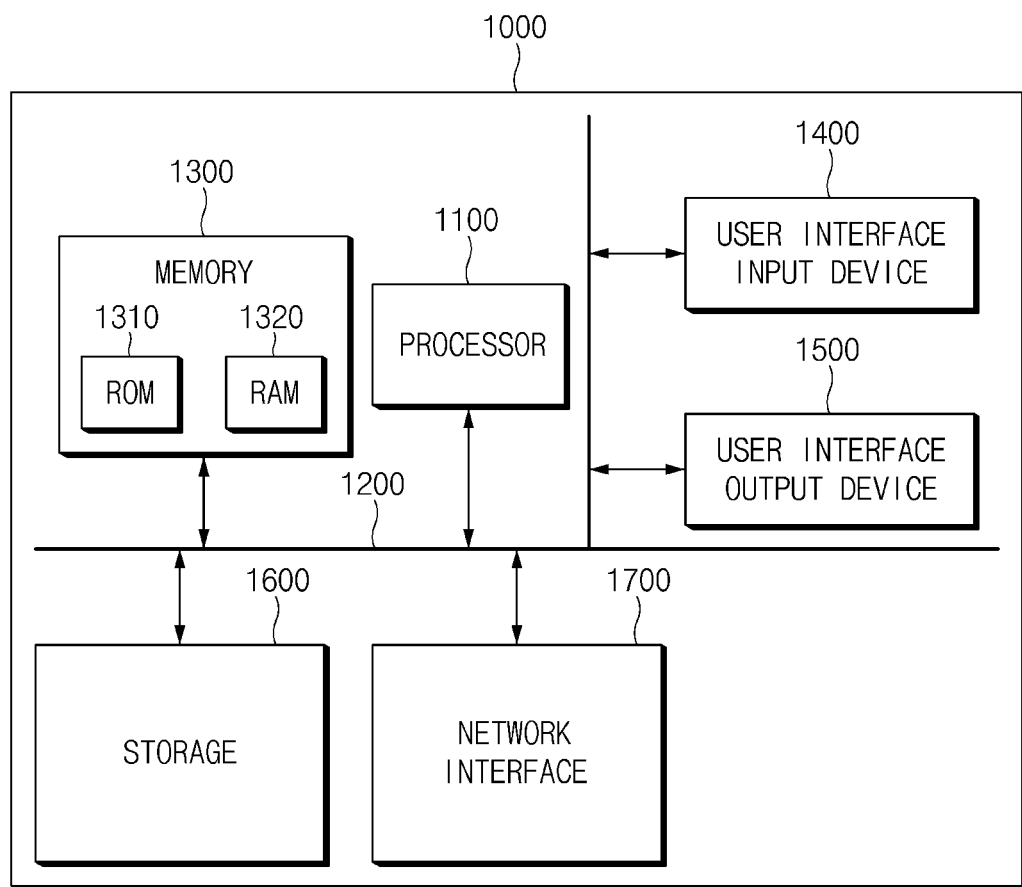
FIG. 8 illustrates a computing system, according to an embodiment of the present disclosure.

As described above, according to an embodiment of the present disclosure, in the method for estimating the position, the global positioning operation of the robot may be performed by using only the sensor provided in the robot instead of the separate device or the complex algorithm, thereby reducing the manufacturing cost of the robot and efficiently performing the procedure of estimating the position, FIG. 8 illustrates a computing system, according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to an embodiment of the present disclosure, in the apparatus for estimating the position, the robot system including the same, and the method thereof, the global positioning operation of the robot may be performed by using only the sensor provided in the robot, instead of the separate device or the complex algorithm, thereby reducing the manufacturing cost of the robot and efficiently performing the procedure of estimating the position, Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for estimating a position of a robot, the apparatus comprising:
   the apparatus configured to obtain data from a sensor provided in the robot, and the data corresponding to terrain around the robot;
   a memory storing program instructions;
   a processor configured to execute the program instructions, the program instructions when executed configured to:
   generate a plurality of particles on a map based on the data sensed by the sensor;
   calculate position accuracy of each of the plurality of particles, based on the data sensed related to the position of the robot, and select, as a reference particle, at least one of the plurality of particles, based on the position accuracy;
   determine the position of the robot, based on the reference particle;
   track the position of the robot by using only the data sensed by the sensor; and
   re-distribute remaining particles other than the reference particle, based on the position accuracy of the reference particle, so that the remaining particles converge on the reference particle so as to track the position of the robot; and
   a driver configured to move the robot based on the position determined by the processor,
   wherein the processor is configured to calculate the position accuracy of each of the plurality of particles by performing convolution for a cost map obtained through distance-transformation for the map, which is stored in the memory, and the sensed data, and
   wherein a value of the cost map varies depending on a distance from a wall or an obstacle.

2. The apparatus of claim 1, wherein the processor selects a particle having position accuracy, which is equal to or greater than a reference value, of the particles as the reference particle.

3. The apparatus of claim 1, wherein the processor calculates the position accuracy of each of the plurality of particles, by comparing the map with the sensed data.

4. The apparatus of claim 1, wherein the processor re-calculates position accuracy of each of a plurality of reference particles after moving the robot to a specific distance or more, when the plurality of reference particles are provided, and re-selects the reference particle, based on the re-calculated position accuracies of the reference particles.

5. The apparatus of claim 4, wherein the processor iteratively selects the reference particle until the reference particles are convergent to one reference particle.

6. The apparatus of claim 5, wherein the processor determines, as the position of the robot, a position of the one reference particle to which the reference particles are convergent.

7. The apparatus of claim 1, wherein the processor determines a position of a reference particle, which has the highest position accuracy, of a plurality of reference particles as the position of the robot, when the plurality of reference particles are provided.

8. A robot system comprising:
   a sensor configured to sense a distance between a robot and a surrounding object, the sensor configured to generate data corresponding to terrain around the robot;
   a memory storing program instructions; and
   a processor configured to execute the program instructions, the program instructions when executed configured to:
   calculate position accuracy of each of a plurality of particles generated on a map, based on the data sensed by the sensor;
   select, as a reference particle, at least one of the plurality of particles, based on the position accuracy;
   estimate a position of the robot, based on the reference particle;
   track the position of the robot by using only the data sensed by the sensor; and
   re-distribute remaining particles other than the reference particle, based on the position accuracy of the reference particle, so that the remaining particles converge on the reference particle so as to track the position of the robot; and
   a driver configured to move the robot based on the position estimated by the processor,
   wherein the processor is configured to calculate the position accuracy of each of the plurality of particles by performing convolution for a cost map obtained through distance-transformation for the map, which is stored in the memory, and the sensed data, and
   wherein a value of the cost map varies depending on the distance from a wall or an obstacle.

9. The robot system of claim 8, wherein the sensor includes a LIDAR sensor to detect the distance between the robot and the surrounding object.

10. The robot system of claim 8, wherein the driver is configured to move the robot and calculate a moving distance of the robot, based on a value measured through a wheel encoder.

11. A method for estimating a position of a robot, the method comprising:
    obtaining data from a sensor provided in the robot, and the data corresponding to terrain around the robot;
    generating, by a processor, a plurality of particles on a map based on the data sensed by the sensor;
    calculating, by the processor, position accuracy of each of the plurality of particles, based on the data sensed related to the position of the robot;
    selecting, by the processor, at least one of the plurality of particles as a reference particle, based on the position accuracy;
    determining, by the processor, the position of the robot, based on the reference particle;
    tracking, by the processor, the position of the robot by using only the data sensed by the sensor;
    re-distributing remaining particles other than the reference particle, by the processor, based on the position accuracy of the reference particle, so that the remaining particles converge on the reference particle so as to track the position of the robot; and
    driving, by a driver, the robot based on the position determined by the processor,
    wherein the processor is configured to calculate the position accuracy of each of the plurality of particles by performing convolution for a cost map obtained through distance-transformation for the map, which is stored in advance, and the sensed data, and
    wherein a value of the cost map varies depending on a distance from a wall or an obstacle.

12. The method of claim 11, wherein the selecting of the at least one of the plurality of particles as the reference particle includes:

selecting a particle having position accuracy, which is equal to or greater than a reference value, of the particles as the reference particle.

13. The method of claim 11, wherein the selecting of the at least one of the plurality of particles as the reference particle includes:

calculating the position accuracy of each of the plurality of particles, by comparing the map with the sensed data.

14. The method of claim 11, wherein the selecting of the at least one of the plurality of particles as the reference particle includes:

re-calculating position accuracy of each of a plurality of reference particles after moving the robot to a specific distance or more, when the plurality of reference particles are provided; and re-selecting the reference particle, based on the re-calculated position accuracies of the reference particles.

15. The method of claim 14, wherein the selecting of the at least one of the plurality of particles as the reference particle includes:

iteratively selecting the reference particle until the reference particles are convergent to one reference particle.

16. The method of claim 15, wherein the determining of the position of the robot includes:

determining, as the position of the robot, a position of the one reference particle to which the reference particles are convergent.

* * * * *